(12) United States Patent
Hsu et al.

(10) Patent No.: US 6,920,640 B2
(45) Date of Patent: Jul. 19, 2005

(54) SUPER-RESOLUTION RECORDABLE OPTICAL DISK

(75) Inventors: Wei-Chih Hsu, Nan-Tou Hsien (TW); Song-Yeu Tsai, Taipei (TW); Mei-Rurng Tseng, Hsin-Chu (TW); Shih-Peng Hsu, Hsin-Chu Hsien (TW); Tien-Tsan Hung, Hsin-Chu (TW); Po-Cheng Kuo, Taipei (TW)

(73) Assignee: Industrial Technology Research Institute, Hsin-Chu Hsien (TW)

( * ) Notice: Subject to any disclaimer, the term of this patent is extended or adjusted under 35 U.S.C. 154(b) by 314 days.

(21) Appl. No.: 10/126,581

(22) Filed: Apr. 22, 2002

(65) Prior Publication Data

US 2002/0154596 A1 Oct. 24, 2002

(30) Foreign Application Priority Data

Apr. 23, 2001 (TW) .................................. 90206315 U

(51) Int. Cl.⁷ ............................ G11B 23/03; G11B 7/24
(52) U.S. Cl. ........................................ 720/719; 369/288
(58) Field of Search .................................. 369/285, 288

(56) References Cited

U.S. PATENT DOCUMENTS

| 6,358,589 B1 | 3/2002 | Tsai et al. .................. 428/64.1 |
| 2003/0193857 A1 * | 10/2003 | Ichihara et al. ............ 369/47.5 |

* cited by examiner

Primary Examiner—George J. Letscher
(74) Attorney, Agent, or Firm—Bacon & Thomas

(57) ABSTRACT

A super-resolution recordable optical disk includes a substrate and forms sequentially on the substrate an under dielectric layer, a mask layer, an interface layer, an organic dye layer, an isolation layer, and a protection layer. A laser beam is projected into the organic dye layer through the substrate to record signals. And a super-resolution recordable optical disk for high numerical apertures also is provided that includes a substrate and forms sequentially on the substrate an organic dye layer, an interface layer, a mask layer an under dielectric layer, and a thin polycarbonate layer. A laser beam is projected into the organic dye layer through the thin polycarbonate layer to record signals.

18 Claims, 10 Drawing Sheets

SUPER-RESOLUTION RECORDABLE OPTICAL DISK

FIELD OF THE INVENTION

The present invention relates to a super-resolution recordable optical disk that has a novel layer structure for increasing storage capacity without the needs of utilizing high power and short-wavelength laser beams. The below-diffraction-limited signals can be retrieved and life time of the optical disk and laser beam can be increased.

BACKGROUND OF THE INVENTION

In the past, consumers were often beset by many problems associated with storage devices such as small capacity, frequent malfunction, low portability or poor circulation capability. Since recordable optical disks were available, and low-cost disk burners software and writers become widely popular, most of the problems mentioned above have been overcome. Nevertheless, to store digital video library data and powerful software requires huge amount of storage space. Even optical disks with storage capacity of 640–800 MB each set still cannot fully meet those requirements. There is a continuous demand for storing more data on every single optical disk.

Storage capacity is determined by recording density. With the recording density increased continuously, recording marks also are shrunk incessantly. However the size of optical spots on optical recording media is restricted by diffraction limits. Signals of recording marks with the sizes smaller than one half of optical spots cannot be detected or picked up. Hence optical spots cannot be shrunk unlimitedly. As a result, increasing of recording density also has limitation. Theoretically, in optical recording systems, the ultimate diffraction limitation for shrinking laser spots is about 0.6 ё/NA. Shorter laser wavelengths and converging lenses with higher numerical apertures (NA) can shrink laser spots much smaller to increase recording density. However blue light laser that has power over 30 mW and life time over 10,000 hours is expensive and not easy to produce. On the other hand, converging lenses of higher NA require very demanding optical and mechanical properties for the corresponding disks and disk drives. To overcome the bottleneck of diffraction limits, techniques such as Super-Resolution Near-Field Structure (Super-RENS) have been developed and introduced for adopting on various types of optical recording media, including Read-Only optical disks, Phase-Change and Magneto-optic optical disks.

Refer to FIG. 1 for the structure of a conventional optical disk. The optical disk is formed on a substrate 1 made from polycarbonate, and is sequentially covered by a recording layer 21 made from organic dyes such as cynanie dyes, azo dyes or phthalocyanines or other dyes that are sensitive to laser beams, a reflective layer 3 made of Au, Ag, Al, Cu or their alloys, and a protection layer 41 made from Ultra Violet (UV) curing resin. During burning or writing, burning light penetrates the substrate 1 and reaches the recording layer 21. Thermal energy of the penetrating light causes reaction in anthocyanosides contained in the recording layer 21 to perform recording function.

Refer to FIG. 2 for the structure of a conventional super-resolution optical disk. The near-field optical disk is formed on a substrate 1, and is sequentially covered by an under dielectric layer 51, a mask layer 52, an interface layer 53, a recording layer 21, an upper dielectric layer 54, and a protection layer 41. The recording layer 21 is made from a phase change material such as GeSbTe, or AgInSbTe; the under dielectric layer 51 and the interface layer 53 may be made from SiNx, SiO$_2$, ZnS—SiO$_2$; and the mask layer 52 may be made from Antimony (Sb), silver oxide (AgOx) or thermochromic organic compounds.

As conventional super-resolution optical disks require very a greater readout power, the recording marks on the recording layer and the optical disks are prone to damage. And life time of laser also suffers.

SUMMARY OF THE INVENTION

Therefore the primary object of the invention is to resolve the aforesaid disadvantages. The invention provides a super-resolution optical disk that can effectively increase the recording capacity of the optical disk.

Another object of the invention is to provide a super-resolution optical disk that is functionable by using laser beams of a lower power.

A further object of the invention is to provide a super-resolution optical disk for increasing service life span of laser beams.

Yet another object of the invention is to provide a super-resolution optical disk for increasing useful life span of the optical disk.

Still another object of the invention is to provide a super-resolution optical disk that is functionable without using blue light as light source of laser.

Another object of the invention is to provide a super-resolution optical disk that is functionable without using high numerical apertures.

Yet another object of the invention is to provide a super-resolution optical disk that utilizes organic dyes for the recording layer.

To achieve the foregoing objects, one embodiment of the invention includes a substrate and forms sequentially thereon an under dielectric layer, a mask layer, an interface layer, an organic dye layer, an isolation layer, and a protection layer. A laser beam is projected into the organic dye layer through the substrate to record signals. Another embodiment of the invention includes a substrate and forms sequentially thereon an organic dye layer, an interface layer, a mask layer, an under dielectric layer, and a thin polycarbonate layer. A laser beam is projected into the organic dye layer through the polycarbonate layer to record signals.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
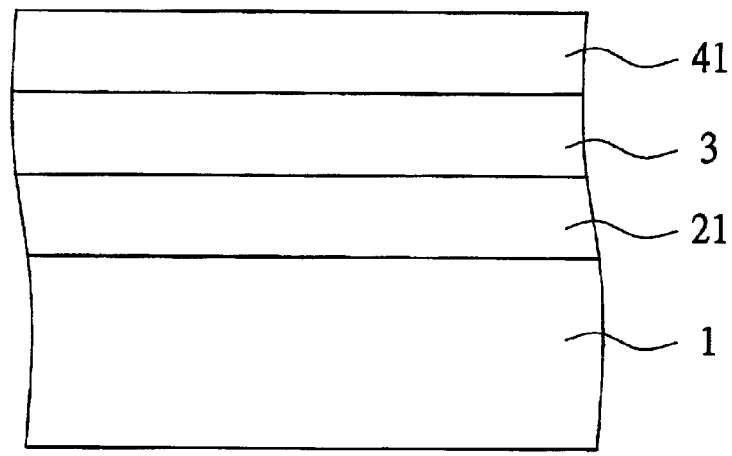
FIG. 1 is a sectional view of the structure of a conventional optical disk.
Figure 2:
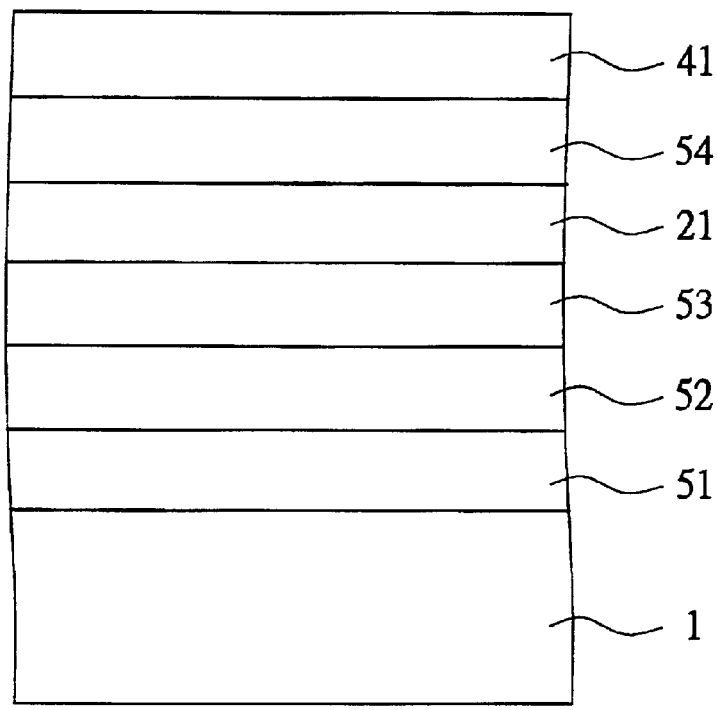
FIG. 2 is a sectional view of the structure of a conventional super-resolution optical disk.
Figure 3A:
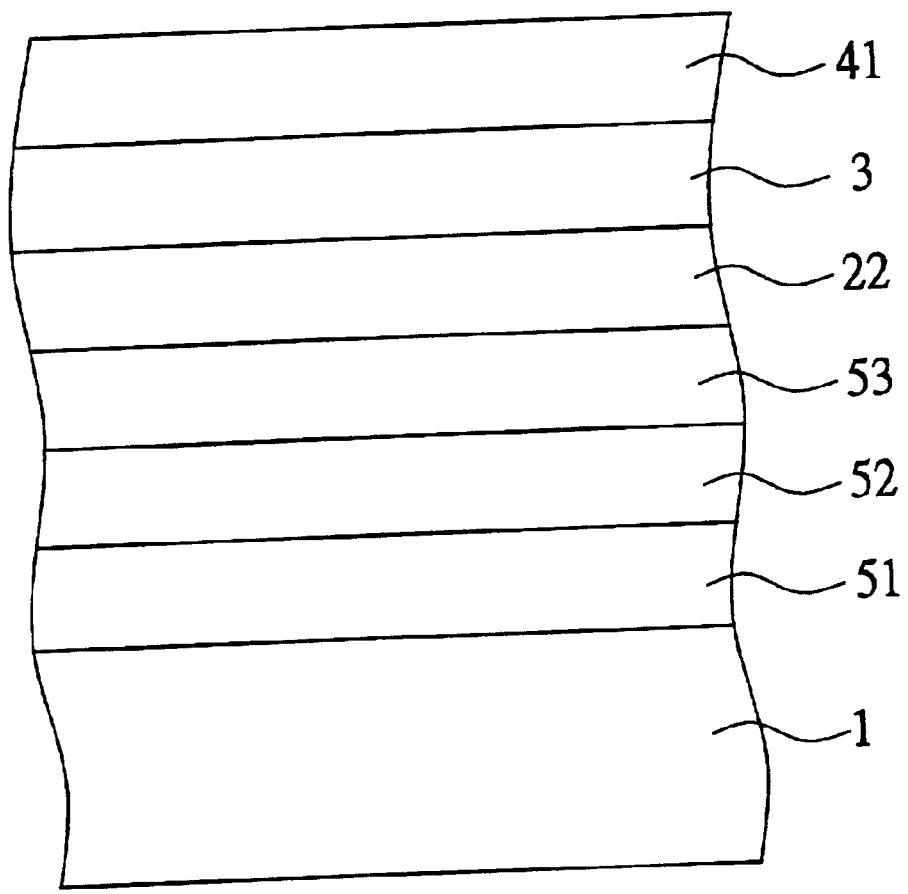
FIGS. 3a and 3b are sectional views of the structure of the super-resolution recordable optical disk of the invention.
Figure 3B:
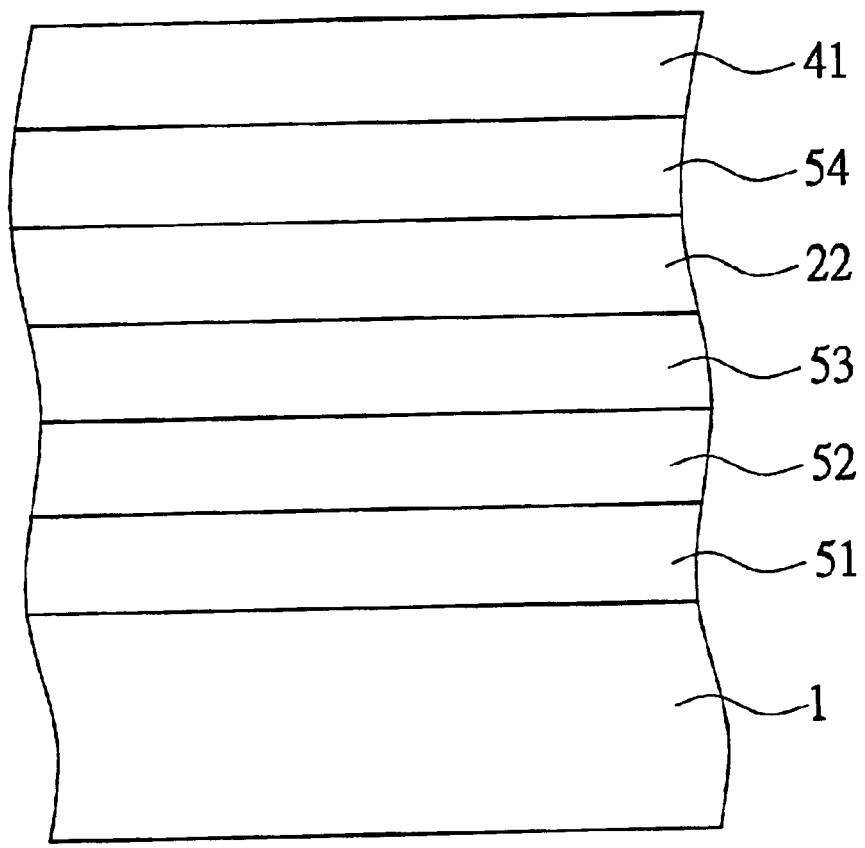

Refer to FIGS. 3a and 3b for the structure of the super-resolution recordable optical disk of the invention. The super-resolution recordable optical disk is formed on a substrate 1 made from polycarbonate and has a thickness between 0.6 and 1.2 mm. On the substrate 1, an under dielectric layer 51 is formed thereon by sputtering. The under dielectric layer 51 may be made from SiNx, $SiO_2$, or ZnS—$SiO_2$ and has a thickness between 90–200 nm. On the surface of the under dielectric layer 51, a mask layer 52 is formed by sputtering with a thickness between 10–20 nm and may be made from Antimony (Sb), silver oxide (AgOx) or thermochromic organic compounds. On the surface of the mask layer 52, an interface layer 53 is formed by sputtering with a thickness between 10–50 nm and may be made from SiNx, $SiO_2$, or ZnS—$SiO_2$. On the surface of the interface layer 53, an organic dye layer 22 is formed by spin coating with a thickness between 60–120 nm and may be made from cynanie dyes, azo dyes or phthalocyanines or other dyes that are sensitive to laser beams. On the surface of the organic dye layer 22 an isolation layer, which also is a reflective layer 3, is formed by sputtering and may be made of Au, Ag, Al, Cu or their alloys with a thickness between 70–160 nm. An upper dielectric layer 54 made from SiNx, $SiO_2$, or ZnS—$SiO_2$ with a thickness between 10–50 nm may be formed and used to substitute the reflective layer 3 set forth above. Finally, a protection layer 41 made from an UV-curing resin is formed on the isolation layer by spin coating with a thickness between 900–6000 nm.

Figure 4A:
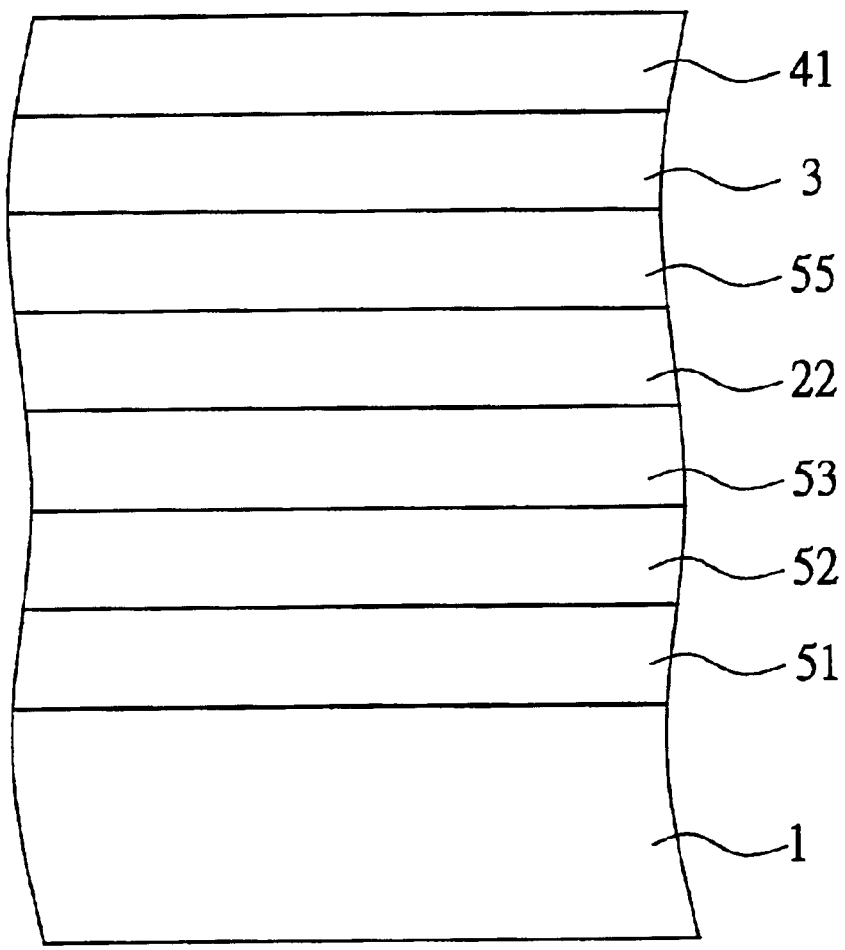
FIGS. 4a and 4b are sectional views of the structure of an embodiment of the super-resolution recordable optical disk of the invention.
Figure 4B:
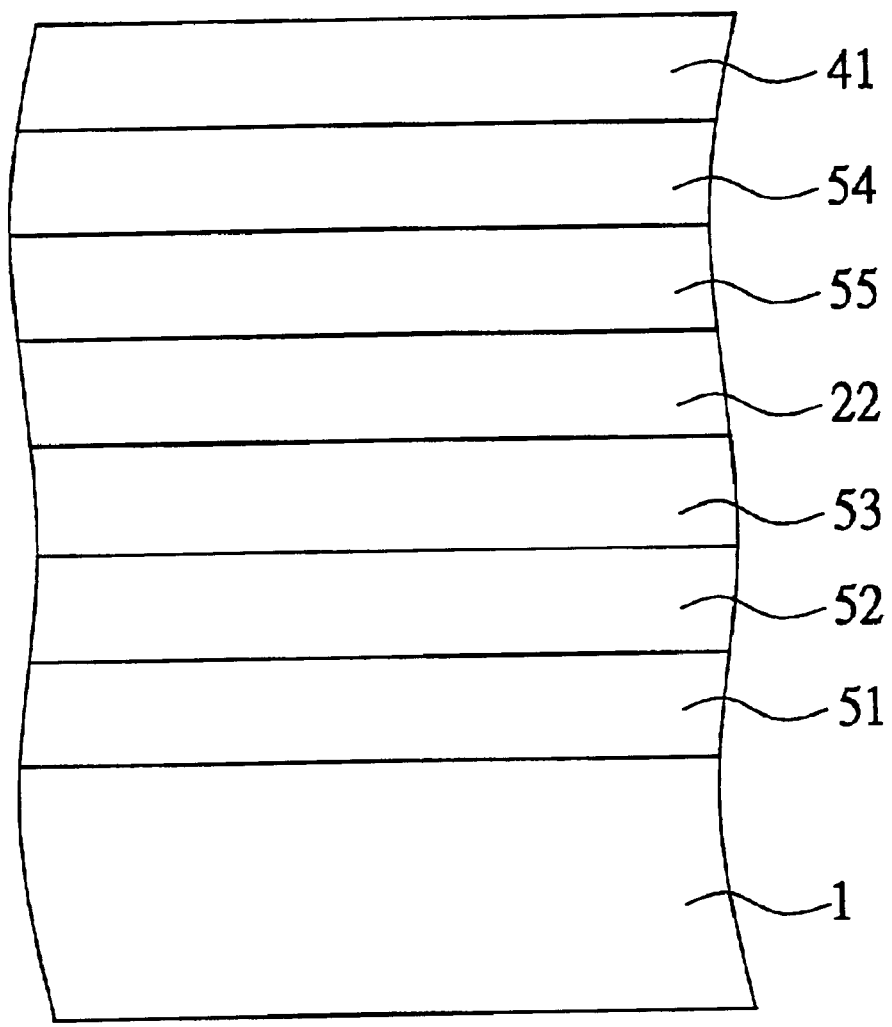

Refer to FIGS. 4a and 4b for the structure of an embodiment of the super-resolution recordable optical disk of the invention. As shown in FIG. 4a, there is a contrast-enhancement layer 55 sandwiched between the organic dye layer 22 and the isolation layer formed by the reflective layer 3. In FIG. 4b, the contrast-enhancement layer 55 is sandwiched between the organic dye layer 22 and the upper dielectric layer 54. The contrast-enhancement layer 55 may be made from polycarbonate or Polymethyl methacrylate (PMMA) by spin coating, or monomer vacuum evaporation and re-polymerization, or Spin On and Peel Off (SOAP) processes, or sputtering a low melting point phase change metal, and with a thickness between 20–100 nm.

Figure 5:
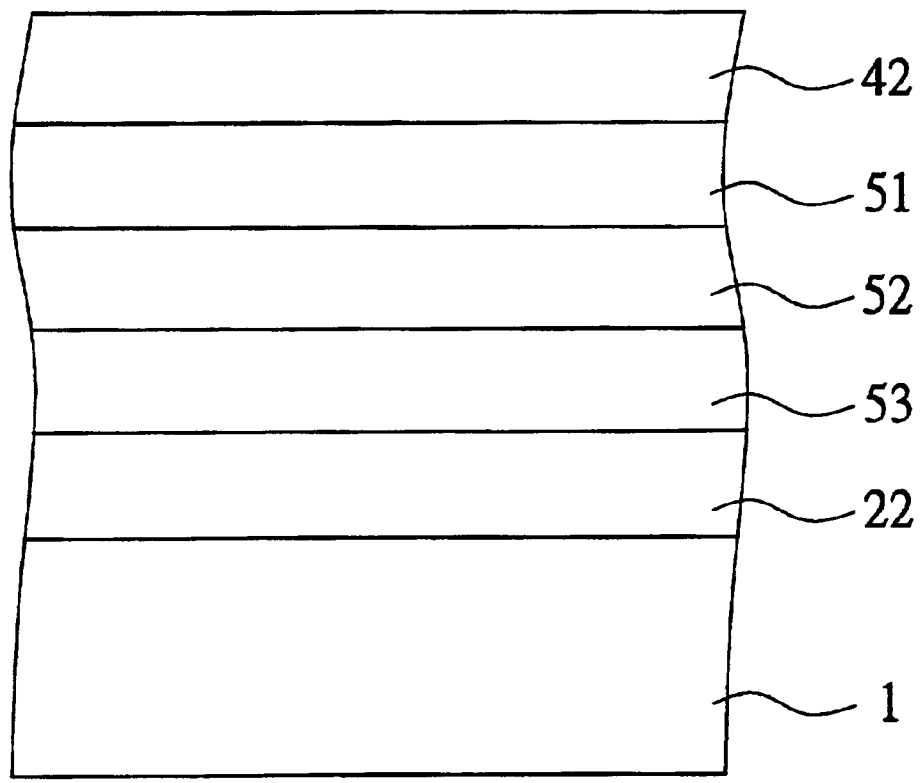
FIG. 5 is a sectional view of the structure of the super-resolution recordable optical disk of the invention adopted for high numerical apertures.

Refer to FIG. 5 for the structure of the super-resolution recordable optical disk of the invention adopted for high numerical apertures. The super-resolution recordable optical disk is formed on a substrate 1 made from polycarbonate and has a thickness between 0.8 and 1.1 mm. On the substrate 1, an organic dye layer 22 is formed by spin coating with a thickness between 60–120 nm and may be made from cynanie dyes, azo dyes or phthalocyanines or other dyes that are sensitive to laser beams; then an interface layer 53 is formed on the surface of the organic dye layer 22 by sputtering with a thickness between 10–50 nm and may be made from SiNx, $SiO_2$, or ZnS—$SiO_2$; then a mask layer 52 is formed on the surface of the interface layer 53 by sputtering with a thickness between 10–20 nm and may be made from Antimony (Sb), silver oxide (AgOx) or thermochromic organic compounds; then an under dielectric layer 51 is formed on the surface of the mask layer 52 by sputtering with a thickness between 90–200 nm and may be made from SiNx, $SiO_2$, or ZnS—$SiO_2$; finally a thin polycarbonate layer 42 is formed on the surface of the under dielectric layer 51 by spin coating, or monomer vacuum evaporation and repolymerization, or spin on and peel off (SOAP) processes with a thickness between 0.1–0.4 mm.

Figure 6A:
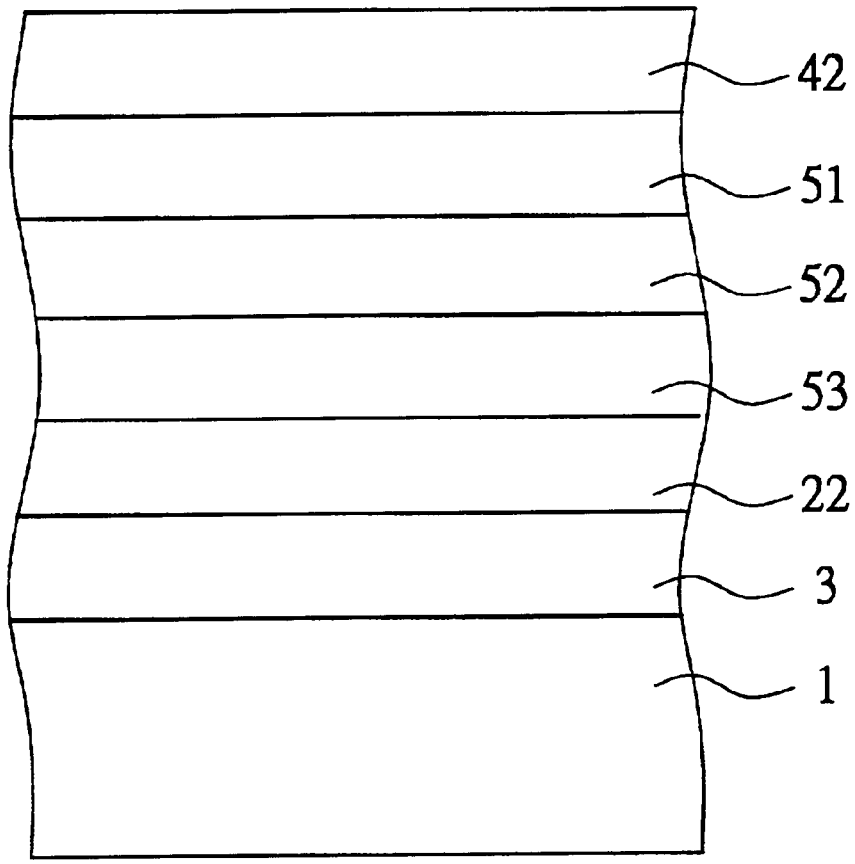
FIGS. 6a and 6b are sectional view of the structure of an embodiment of the super-resolution recordable optical disk of the invention adopted for high numerical apertures.
Figure 6B:
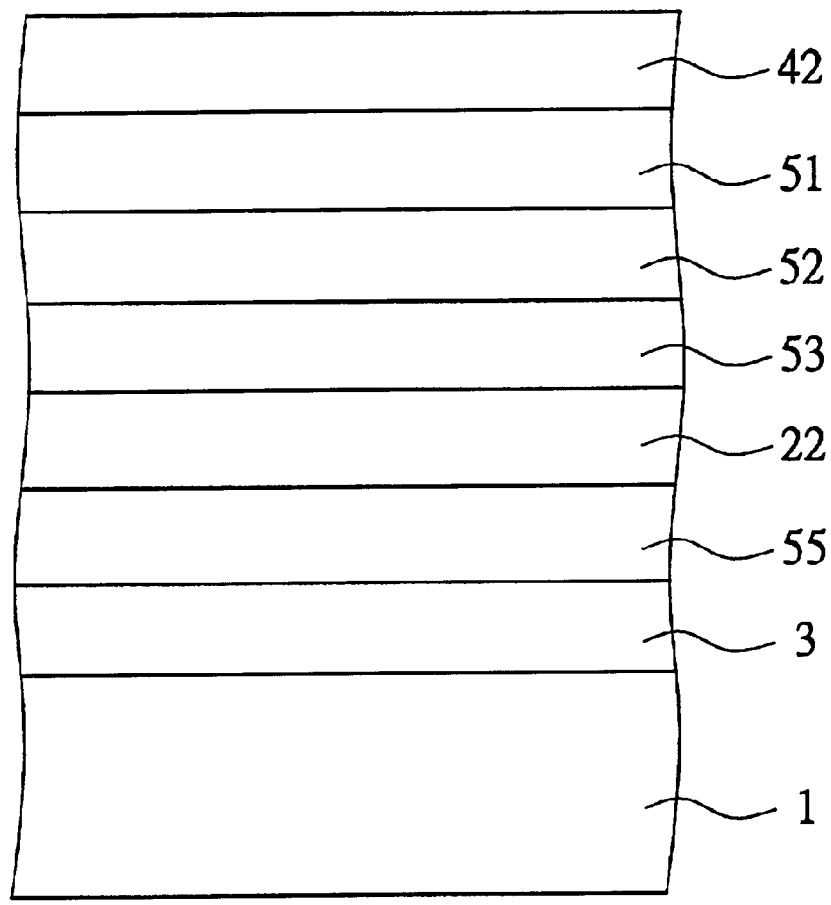

Refer to FIGS. 6a and 6b for the structure of an embodiment of the super-resolution recordable optical disk of the invention adopted for high numerical apertures. As shown in FIG. 6a, there is a reflective layer 3 formed between the substrate 1 and the organic dye layer 22 by sputtering. The reflective layer 3 may be made of Au, Ag, Al, Cu or their alloys with a thickness between 70–160 nm. Referring to FIG. 6b, there is further a contrast-enhancement layer 55 sandwiched between the organic dye layer 22 and the reflective layer 3. The contrast-enhancement layer 55 may be made from polycarbonate or polymethyl methacrylate (PMMA) by spin coating, or monomer vacuum evaporation and re-polymerization, or spin on and peel off (SOAP) processes, or sputtering a low melting point phase change metal, and with a thickness between 20–100 nm.

Embodiment No. 1:

On a substrate made from polycarbonate and has a thickness of 0.6 mm, process sputtering sequentially in a vacuum environment of $5\times10^{-6}$ torr or below, and argon pressure of 3 mtorr to form a mask layer consisting of a SiNx layer of a thickness 170 nm, a Sb layer of a thickness 15 nm and a SiNx layer of a thickness 20 nm; form an organic dye layer made from cynanie dyes by spin coating with a thickness of 90 nm on the surface of the mask layer; form a reflective layer made of Au by sputtering with a thickness of 90 nm on the surface of the organic dye layer; and coat a protection layer made from resin with a thickness of 1500 nm on the surface of the reflective layer.

A laser beam of wavelength 635 nm is employed; the numerical aperture of the converging lens is 0.6; constant linear velocity (CLV) of disk rotation is 2.5–3.5 meter/second; recording signals are concurrently recorded on the land or groove of the disk; writing power is between 8.0 and 12.0 mW, and reading power is between 0.7 and 4.0 mW.

Embodiment No. 2:

On a substrate made from polycarbonate and has a thickness of 0.6 mm, process sputtering sequentially in a vacuum environment of $5\times10^{-6}$ torr or below, and argon pressure of 3 mtorr to form a mask layer consisting of a SiNx layer of a thickness 170 nm, a Sb layer of a thickness 15 nm and a SiNx layer of a thickness 20 nm; form an organic dye layer made from cynanie dyes by spin coating with a thickness of 90 nm on the surface of the mask layer; form a reflective layer made of Au by sputtering with a thickness of 90 nm on the surface of the organic dye layer; form an upper dielectric layer made of SiNx by sputtering with a thickness of 20 nm on the surface of the reflective layer; and coat a protection layer made from resin with a thickness of 1500 nm on the surface of the upper dielectric layer.

A laser beam of wavelength 635 nm is employed; the numerical aperture of the converging lens is 0.6; constant linear velocity (CLV) of disk rotation is 2.5–3.5 meter/second; recording signals are concurrently recorded on the land or groove of the disk; writing power is between 8.0 and 12.0 mW, and reading power is between 0.7 and 4.0 mW.

Figure 7:
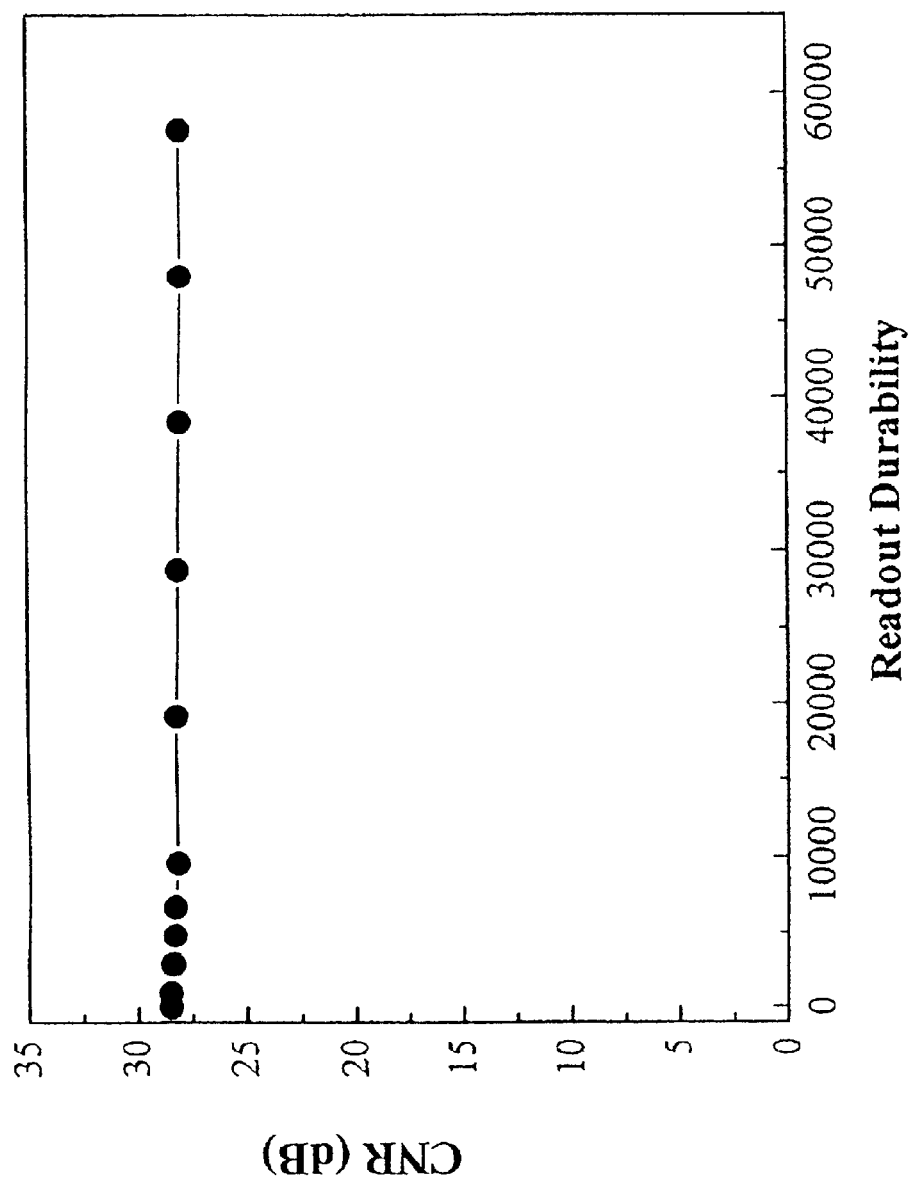
FIG. 7 is a chart showing the relationship between the carrier noise ratio and readout durability according to Embodiment No. 1 of the invention with recording marks of 200 nm.

Refer to FIG. 7 for the relationship between the carrier noise ratio (CNR) and readout durability according to Embodiment No. 1 set forth above. The optical disk is made according to Embodiment No. 1 of the invention. Reading is performed with reading power of 2.0 mW and on recording marks of 200 nm. The results show that thermal stability is above 6×10$^4$ during reading without declining the carrier noise ratio.

Figure 8:
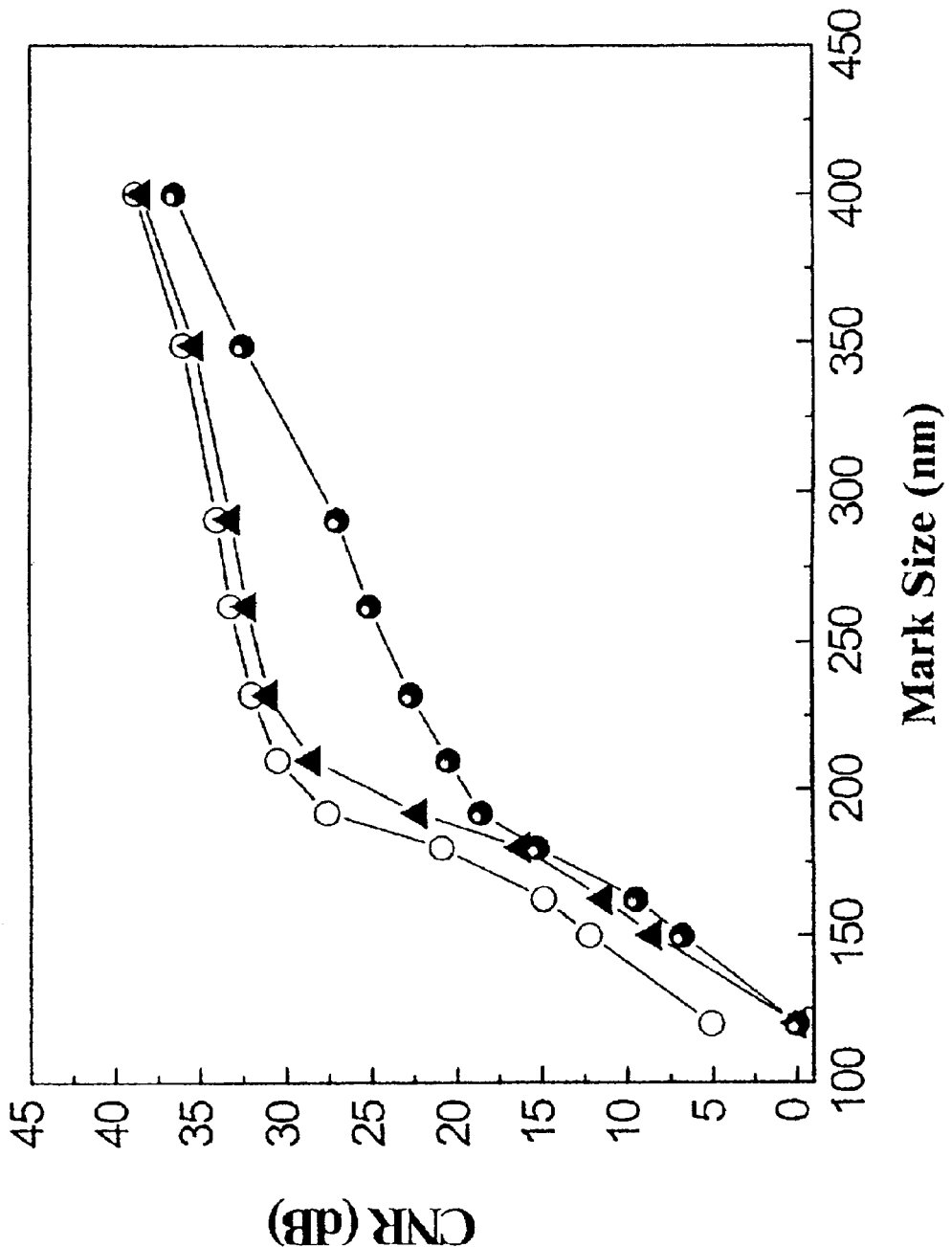
FIG. 8 is a chart showing the relationship between the carrier noise ratio and the size of recording marks according to an embodiment of the invention.

Refer to FIG. 8 for the relationship between the carrier noise ratio and the size of recording marks according to the invention. The chart is obtained based on the optical disk made according to Embodiment No. 1 set forth above. Notations "○" indicate reading power is 3 mW, and notations "▲" indicate reading power is 2 mW. Notations "●" indicate reading power is 3.5 mW for the optical disk made according to Embodiment No.2 set forth above. As shown in the chart, when the size of recording marks is smaller than 150 nm, or even 120 nm, which is beyond the scope of the conventional resolution of optical spot, resolution can still be accomplished when the invention is adopted.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A super-resolution recordable optical disk, comprising:
   a substrate;
   an under dielectric layer formed on one side of the substrate;
   a mask layer formed on an upper side of the under dielectric layer;
   an interface layer formed on an upper side of the interface layer;
   an organic dye layer formed on an upper side of the interface layer;
   an isolation layer formed on an upper side of the organic dye layer; and
   a protection layer formed on an upper side of the isolation layer;
   wherein a laser beam is projected through the substrate into the organic dye layer for recording signals; and
   further having a contrast-enhancement layer located between the organic dye layer and the isolation layer.

2. The super-resolution recordable optical disk of claim 1, wherein the isolation layer is a reflective layer.

3. The super-resolution recordable optical disk of claim 2, wherein the reflective layer has a thickness ranging from 70 nm to 160 nm.

4. The super-resolution recordable optical disk of claim 1, wherein the isolation layer is an upper dielectric layer.

5. The super-resolution recordable optical disk of claim 4, wherein the upper dielectric layer has a thickness ranging from 10 nm to 50 nm.

6. The super-resolution recordable optical disk of claim 1, wherein the contrast-enhancement layer is made from a material selected from the group consisting of polycarbonate, polymethyl methacrylate, and a low melting point phase change metal; and 7. The super-resolution recordable optical disk of claim 1, wherein the contrast-enhancement layer has a thickness ranging from 20 nm to 100 nm.

8. The super-resolution recordable optical disk of claim 1, wherein the under dielectric layer has a thickness ranging from 90 nm to 200 nm.

9. The super-resolution recordable optical disk of claim 1, wherein the mask layer has a thickness ranging from 10 nm to 20 nm.

10. The super-resolution recordable optical disk of claim 1, wherein the interface layer has a thickness ranging from 10 nm to 50 nm.

11. A super-resolution recordable optical disk, comprising:
    a substrate;
    an under dielectric layer formed on one side of the substrate;
    a mask layer formed on an upper side of the under dielectric layer;
    an interface layer formed on an upper side of the interface layer;
    an organic dye layer formed on an upper side of the interface layer;
    an isolation layer formed on an upper side of the organic dye layer; and
    a protection layer formed on an upper side of the isolation layer;
    wherein a laser beam is projected through the substrate into the organic dye layer for recording signals;
    further having a contrast-enhancement layer located between the organic dye layer and the isolation layer;
    wherein the contrast-enhancement layer is made from a material selected from the group consisting of polycarbonate, polymethyl methacrylate, and a low melting point phase change metal; and
    wherein the contrast-enhancement layer has a thickness ranging from 20 nm to 100 nm.

12. The super-resolution recordable optical disk of claim 11, wherein the isolation layer is a reflective layer.

13. The super-resolution recordable optical disk of claim 12, wherein the reflective layer has a thickness ranging from 70 nm to 160 nm.

14. The super-resolution recordable optical disk of claim 11, wherein the isolation layer is an upper dielectric layer.

15. The super-resolution recordable optical disk of claim 14, wherein the upper dielectric layer has a thickness ranging from 10 nm to 50 nm.

16. The super-resolution recordable optical disk of claim 11, wherein the under dielectric layer has a thickness ranging from 90 nm to 200 nm.

17. The super-resolution recordable optical disk of claim 11, wherein the mask layer has a thickness ranging from 10 nm to 20 nm.

18. The super-resolution recordable optical disk of claim 11, wherein the interface layer has a thickness ranging from 10 nm to 50 nm.

* * * * *